Sept. 3, 1946. O. E. HOFFMAN ET AL 2,406,948
COIN HANDLING MACHINE
Filed Sept. 7, 1942 7 Sheets-Sheet 1

Fig. 1

INVENTORS
Otis E. Hoffman
Earl W. Frank
William H. Sprenger
BY Quarles & French
ATTORNEYS Sept. 3, 1946.  O. E. HOFFMAN ET AL  2,406,948
COIN HANDLING MACHINE
Filed Sept. 7, 1942   7 Sheets-Sheet 3

INVENTORS
Otis E. Hoffman
Earl W. Quirk
William H. Sprenger
BY Quarles & Frinck
ATTORNEYS Sept. 3, 1946.        O. E. HOFFMAN ET AL        2,406,948
                       COIN HANDLING MACHINE
                     Filed Sept. 7, 1942        7 Sheets-Sheet 4

INVENTORS
Otis E. Hoffman
Earl W. Dirk
William H. Sprenger
BY Quarles & French
ATTORNEYS Sept. 3, 1946.    O. E. HOFFMAN ET AL    2,406,948
COIN HANDLING MACHINE
Filed Sept. 7, 1942    7 Sheets-Sheet 7

INVENTORS
Otis E. Hoffman
Earl W. Dick
William H. Sprenger
BY Quarles & French
ATTORNEYS.

Patented Sept. 3, 1946

2,406,948

UNITED STATES PATENT OFFICE 2,406,948

COIN HANDLING MACHINE

Otis E. Hoffman, Earl W. Quirk, and William H. Sprenger, Watertown, Wis., assignors to Brandt Automatic Cashier Company, Watertown, Wis., a corporation of Wisconsin Application September 7, 1942, Serial No. 457,556

14 Claims. (Cl. 133—4)

1

The invention relates to coin delivery machines.

Heretofore coin delivery machines have been manually operated, and in the case of machines where considerable change making or change paying is done in a day the manual work of operating the machine becomes of some consequence and is fatiguing to the operator. The main object of this invention is to provide a coin delivery machine in which the coin delivery mechanism is motor operated. This does not mean merely the attachment of some power drive to machines already in use but has necessitated a reorganization of the manually operated coin delivery machine. In accordance with the present invention, the keyboard of the machine is not used to operate the coin ejectors but is used to set the coin ejectors in a position for operation by the motor drive, and this motor drive is designed for one complete cycle after which the motor can be stopped.

A further object of this invention is to provide mechanism for repeating the single motor operated cycle as many times as are within the limits of the machine, for example from two to ten times.

The invention further consists in the several features hereinafter set forth and more particularly defined by claims at the conclusion hereof.

2

Figure 5:
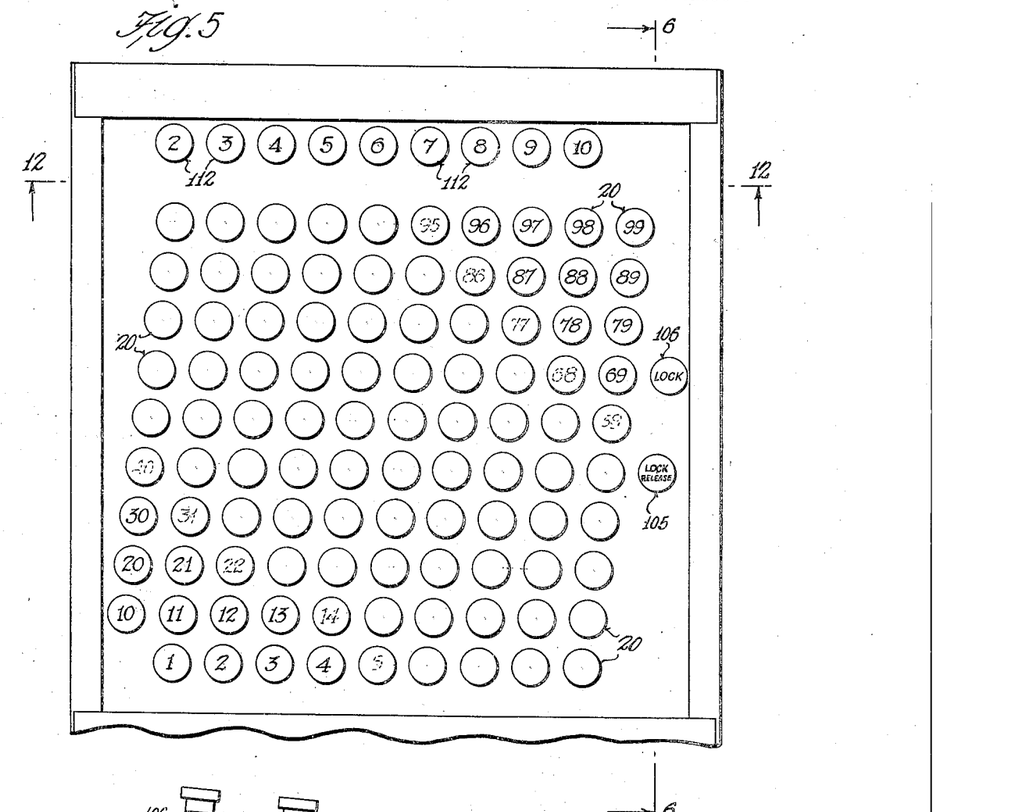
Fig. 5 is a plan view of the keyboard portion of the machine.

Referring to Fig. 5, we have shown a keyboard such as is used on a machine for paying out the amount of change indicated on the keys in the form of coins such as pennies, nickels, dimes, quarters, and half dollars. Such a machine is designed as a payer. In some instances, the keys may represent the difference between the amount of change and a dollar or certain pre-determined fractions thereof and is thus designed as a changer. The invention is applicable to either form of machine. There are ninety-nine keys 20 on the general keyboard. These keys are of known construction and are spring operated to a release position, and their details may be found in the following prior patents: Brandt Patent No. 1,850,198, dated March 22, 1932, and Brandt Patent No. 1,822,560, dated September 8, 1931. The keys are designed to provide one or more projections 21, each of which is disposed over a rocker 22, each pivotally mounted on pivot pins 23 in the side frame members 24 of the machine and held against the keys by a spring 22' (see Figs. 1 and 2). Each rocker has a depending lug portion 25 which is pivotally secured at 26 to an end of an ejector setting bar 27 whose other end is pivotally connected at 28 with one arm of an ejector raising lever 29. This lever together with a lever 33 are pivotally mounted on a fixed shaft 30 extending transversely of the machine. The coin ejector member 31 is pivotally mounted on a transversely extending shaft 32. Each ejector member when in a raised position is yieldingly urged upwardly by a lever 33 and a spring 33' interposed between the levers 29 and 33 and urging said ejector against the upper end of its guide slot 31' in a coin tray 35.

Figure 1:
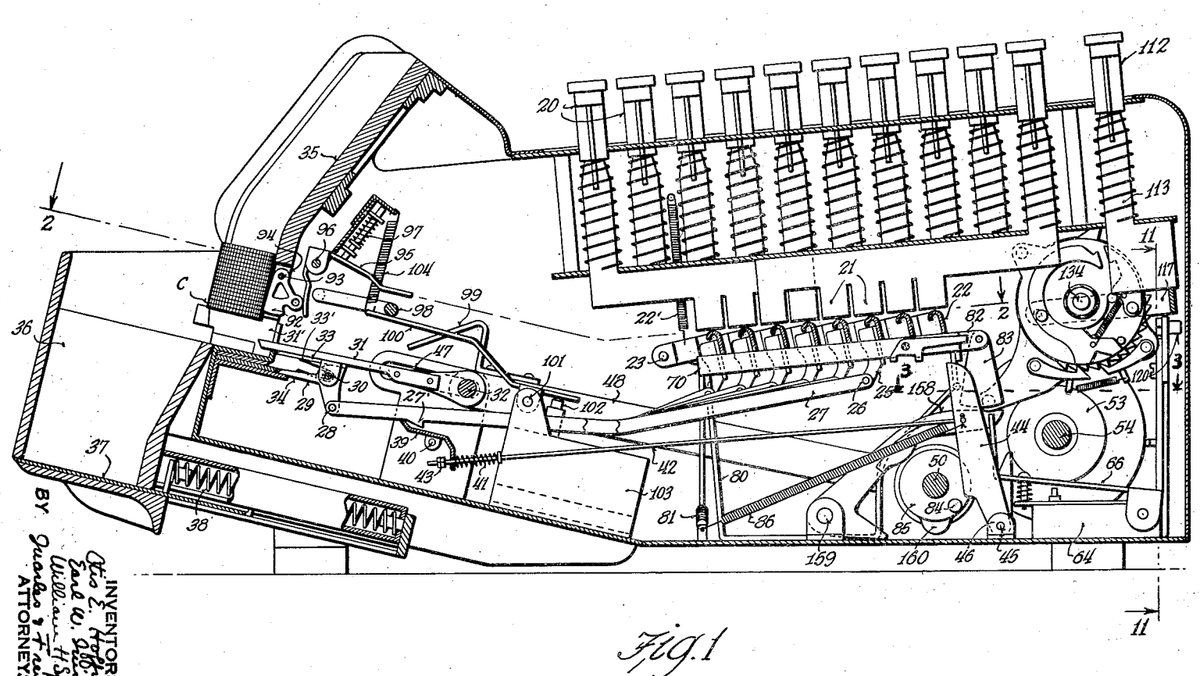
Fig. 1 is a vertical sectional view taken on the line 1—1 of Fig. 2.

The depression of the key acts, as noted above and as shown in Fig. 17, to swing the levers 29 and 33 to raise the coin ejector member or finger 31 to a position where it will engage the coin C on its forward stroke and push the coin from the coin tray 35 into the delivery chute 36 whose discharge opening may be controlled by an operator operated door 37 which is returned to a closed position by a spring 38 (see Fig. 1).

Figure 17:
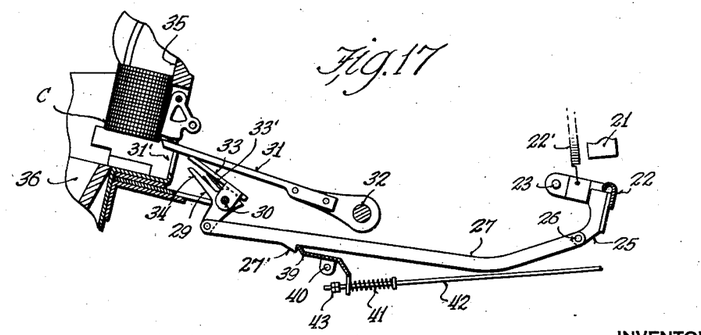
Fig. 17 is a detailed view of parts shown in Fig. 1 showing them in operating position.

After an ejector setting bar 27 is moved to its operating or ejecting position in a plane to engage the lowermost coin of its associated holder, it is held in this position by a latch plate 39 (see Figs. 1 and 17). This plate is medially pivotally mounted at its ends 40 on the sides of the machine and is normally urged to a "locked" position behind a lug 27' by a spring 41 which is mounted on a latch plate release rod 42 which is provided with adjustable stop nuts 43 at its outer end for engaging said plate 39 and is connected at its other end to a main release lever 44 pivotally mounted at 45 on brackets 46 on the base of the machine.

Figure 2:
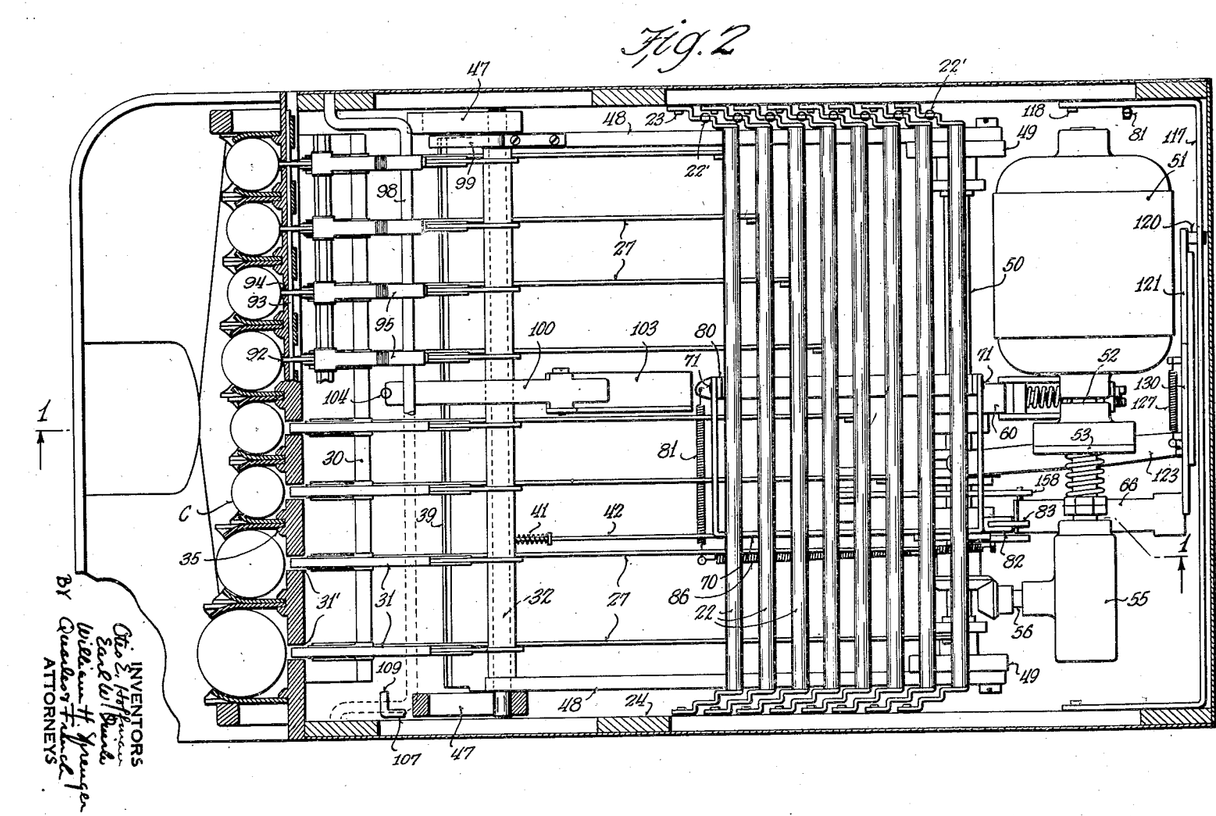
Fig. 2 is a horizontal sectional view taken on the line 2—2 of Fig. 1.
Figure 7:
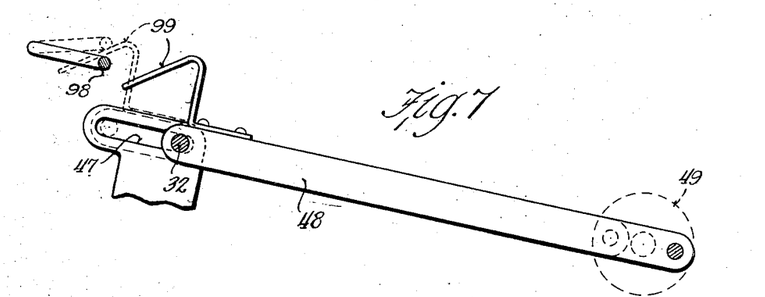
Fig. 7 is a detailed view of part of the driving mechanism.

For moving the raised fingers 31 to a coin-ejecting position the shaft 32 is moved forwardly in slotted guides 47 by operative connection at its ends with links 48 which are operatively connected to spaced crank disks 49 on a motor driven shaft 50 (see Figs. 1, 2, and 7).

Figure 3:
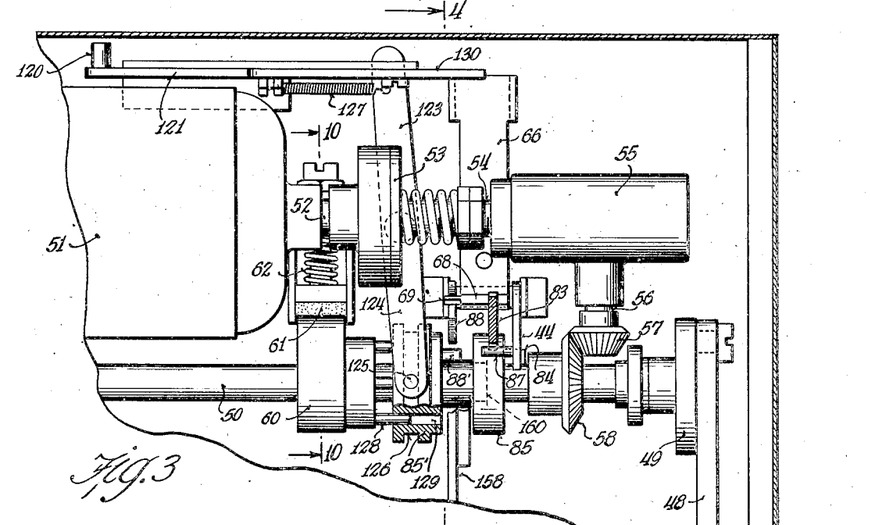
Fig. 3 is an enlarged horizontal sectional view taken along the line 3—3 of Fig. 1.
Figure 10:
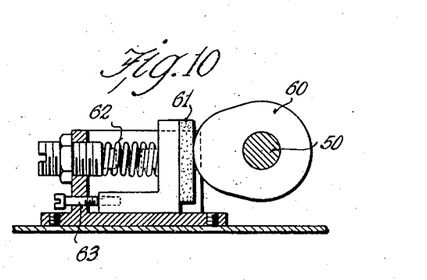
Fig. 10 is a detailed sectional view taken on the line 10—10 of Fig. 3.
Figure 11:
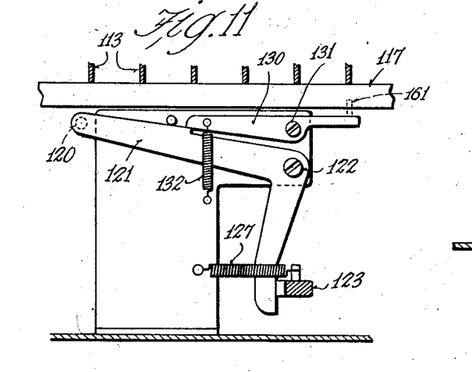
Fig. 11 is a detailed sectional view taken on the line 11—11 of Fig. 1.

The shaft 50 is given one revolution each time any one of the change keys is depressed by its mechanical connection with an electric motor 51 controlled by the keys 26. As shown in Fig. 3, the shaft 52 of the motor is connected through an automatically releasable friction clutch 53 of any suitable construction with a shaft 54 which drives through a reduction gear 55 to a shaft 56 carrying a bevel gear 57 meshing with a bevel gear 58 on the shaft 50. Toward the end of one rotation of the shaft 50 its rotation may be stopped by any suitable brake mechanism. As herein shown in Fig. 10, the brake comprises a brake cam 60 on the shaft 50 engaged by a slidably mounted brake shoe 61 which is continuously pressed against the cam 60 by a spring 62, the inward movement of the shoe being limited by an adjustable stop screw 63 mounted on said shoe, see Fig. 10.

Figures 4, 13:
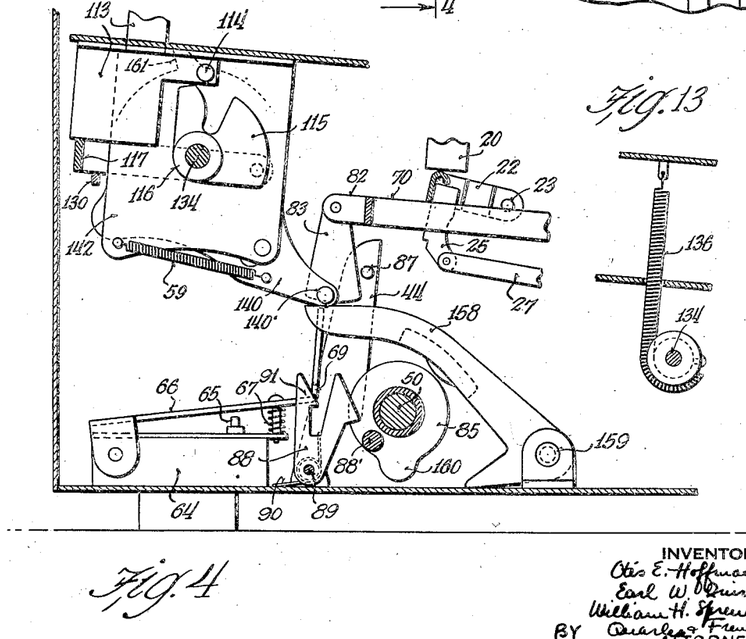
Fig. 4 is a detailed sectional view taken on the line 4—4 of Fig. 3.
Fig. 13 is a detailed sectional view taken on the line 13—13 of Fig. 12.
Figure 8:
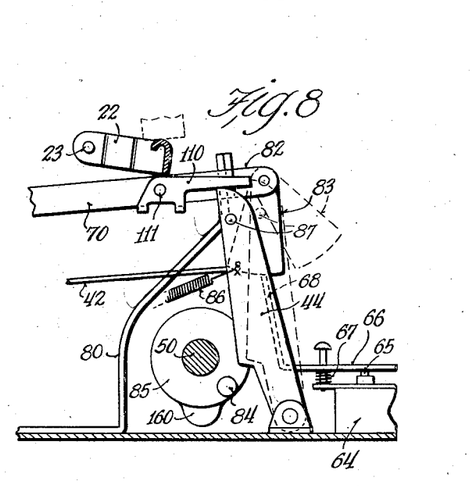
Fig. 8 is an enlarged view of parts shown in Fig. 1 but with the parts in a switch-closing position.
Figure 9:
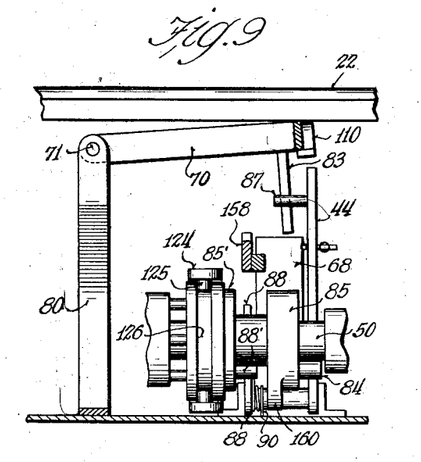
Fig. 9 is a front elevational view of parts shown in Fig. 8.

A main switch 64 (Figs. 3, 4, and 8) controls the supply of electric current to the motor 51 and includes a push button 65 and a pivoted switch operating arm 66 which is yieldingly held in an inoperative position by a spring 67. The arm 66 has an upstanding portion 68 and a laterally extending lug 69.

A U-shaped lever 70 (Figs. 1, 2, 9, and 8) is pivotally connected at 71 with suitable bracket arms 80 and is normally urged by a coiled tension spring 81 connected with an arm of said lever beyond its pivot into engagement with the lower edges of the rockers 22. Extending laterally from the transverse portion of the lever 70 is a forked portion 82 in which a dog 83 is loosely pivotally mounted in line with the upper end of the switch arm 66, so that depression of the lever 70 by any one of the rocker levers 22 will move the arm 66 downwardly into contact with the button 65 to close the motor switch 64 (see Fig. 8).

As soon as the switch 64 is closed, the motor 51 is started, and the shaft 50 is in a position so as to start moving the raised finger 31 outwardly. Those of the ejector fingers 31 that are raised are in the position shown in Fig. 7, but those that are not raised are in the position shown in Fig. 1, and while the lowered fingers will move forwardly, they will not act on any of the coins. After a half revolution of the shaft 50, the fingers 31 are pulled back, and near the end of this return movement of the fingers a pin 84 on a disk 85 slidably keyed to the shaft 50 comes into contact with the release lever 44 pushing it rearwardly against the action of its spring 86 (see Figs. 4 and 8). The lever 44 has a laterally extending pin 87 mounted on it movable into engagement with the dog 83 as the shaft 50 completes its turning cycle with the result that the dog 83 is swung upwardly from the position shown in Fig. 4 to the dotted line position shown in Fig. 8, and at about the same time or shortly thereafter the pin 88' on a disk 85' engages a switch arm locking latch 88 pivotally mounted at 89 and yieldingly moved to a locking position by a torsion spring 90. The disk 85' is connected to or formed integral with the disk 85, the pin 88' being in substantially the same angular position on the disk 85' as the pin 84 is on the disk disk 85. In its locked position the end 91 of the latch engages the laterally extending lug 69 on the switch operating arm 66, but as soon as the latch 88 is released from the lug 69, the spring 67 moves the arm 66 upwardly to an inoperative position free of the push button 65, and the motor is brought to a stop by the cutting out of the current and the application of the brake mechanism previously described (see Fig. 4).

In all coin handling machines, means are provided to prevent further operation of the machine in case the coins in any one of the stacks or holders become depleted to such an extent as to need replenishment. Usually this mechanism provides for a locking of the machine under the control of the operator just before the coin stack is exhausted, so that one or possibly two more payments may be made before replenishing the stack. For accomplishing this purpose, a coin engaging finger or lever 92 is pivotally mounted at its upper end 93 to work in a slot 94 in each holder portion of the coin tray (see Fig. 1). Each finger 92 is yieldingly held against the stack of coins by a small bell crank lever 95 pivotally mounted on a transversely extending shaft 96 and yieldingly urged into engagement with its finger by a coil spring 97. The levers 95 are adapted to be engaged by a pressure release bar 98 extending across the machine under one set of the arms of said levers and pivotally mounted on the machine beneath said arms of said levers and adapted to be moved upwardly into engagement with said levers to release their pressure on the fingers 92 on each operation of the machine by engagement of the cam or wedge projection 99 mounted on the end of one of the links 48. Relieving the finger 92 of the pressure of the spring 97 permits the coins in the chute sections of the tray to descend to a position where they may be pushed out of the machine by their respective ejector member. The member 98 also controls a switch operating arm 100 which is pivoted at 101 and is adapted to engage the push button portion 102 of a circuit control switch 103 in the motor current supply circuit and which is in series with the switch 64 for controlling the motor, so that opening of either of these switches will stop the motor. The switch arm 100 is normally moved to a closed position by a coiled spring 104. When, however, the member 98 swings down from the position shown in Fig. 1, it will contact the switch arm 100 and swing the same to a circuit opening position against the tension of the spring 104. This occurs when any one of the levers 95 swing down so as to engage the member 98 under the action of its spring 97, and this takes place any time any finger 92 is free to swing inwardly into its coin stack due to the fact that there are no coins above said finger and under which conditions there are either one or two coins left in the stack. Thus, at any time that the coins in any of the stacks become depleted the cutting out of the switch 103 will stop the motor and hence the operation of the machine. The machine may then under the control of the operator be given one or more operations through the use of the lock release key 105.

Figure 6:
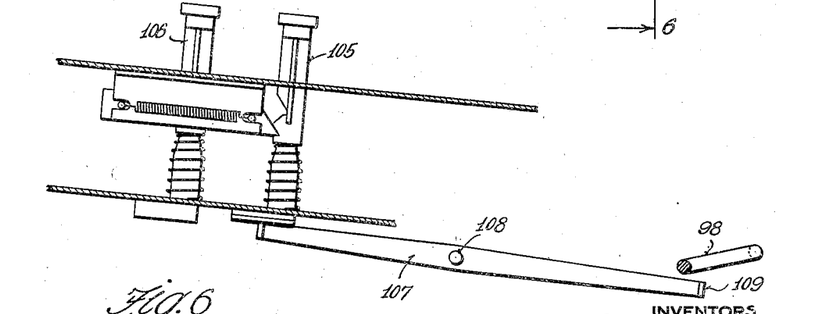
Fig. 6 is a detailed sectional view taken along the line 6—6 of Fig. 5.

This lock release key 105 is associated with the lock key 106 in a manner similar to similar keys on the manually operated machine, as for example those shown in U. S. Patent No. 1,401,103, dated December 27, 1921, in which the interlocking connection between the keys 105 and 106 is explained. The key 105, as shown in Fig. 6, acts on a lock release lever 107 which is pivoted intermediate its ends at 108 at the side of the machine and has an end 109 movable into engagement with the member 98 so as to swing the same upwardly out of engagement with the switch arm 100 in case said member is being held in engagement with said switch arm because of the depletion of the coins in any one of the stack sections of the tray. Normally the key 106 is depressed, but depression of the key 105 under the conditions above described releases the key 106.

In operating the keys, if an operator should hold one of the keys down for a prolonged period, there is a chance of a continued operation of the machine, and in order to prevent the making of more than one payment a dog or latch 110 is pivotally mounted intermediate its ends at 111 on the lever 70 (see Figs. 1 and 8) and acts to keep the release lever 44 in a retracted position and consequently the plate 83 controlled thereby out of alignment with the lever 68 thereby preventing holding switch 65 closed. The latch 110 is in the plane of movement of the release lever 44, so that when the lever 70 moves down to operate the switch arm 66, the latch will engage the top of said lever 44 and ride over the same and as the said lever is moved backwardly by the pin 84 will drop down in front of said lever at the end of its movement and thus keep the plate 39 in a lowered position to insure all ejector fingers are released and prevent the return movement of said lever by its spring 86 until the operator releases the depressed key or keys of the keyboard that are then holding down the lever 70. Under these conditions the lever 44 being in dotted line position shown in Fig. 8 also holds the dog 83 in a position where it cannot engage the switch lever 68 thereby preventing holding of switch 65 in a closed position.

From the above description, it will be noted that the ordinary operation of the machine occurs when the lock key 106 is pressed down and one or more of the keys 20 are depressed for paying out the desired change, and that under these conditions those ejectors controlled by keys 20 that are depressed will be up in a coin ejecting position, and consequently the motor 51 which has been started through the depression of one or more of the keys 20 will through its drive connections move the raised fingers to eject the coins from those stacks or holders of the coin tray 35 with which they are associated and deliver these coins to the discharge chute 36 from which they can be removed by the operator as previously described. As soon as the coins in any one of the stacks become depleted, as previously noted, the switch 103 is automatically operated to stop the motor 51. Then if the operator presses down on the lock release key 105, one or more motor operated operations of the machine may be had before the depleted stack is completely depleted at which time it will, of course, be necessary for the operator to replenish this stack if he intends to dispense change accurately from the machine.

If it is desired to repeat the paying of the same amount of money from the coin stacks, the operator presses down on one of the repeat keys 112 before pressing down on the denomination key 20. There are nine keys 112 shown in Fig. 5 to provide from two to ten repetitions of operations of the shaft 50 until the machine is stopped. Each key has a spring returned plunger 113 provided with a lug 114 adapted on its downward movement to engage a repeater setting cam member 115 which is mounted on a shaft 116, Fig. 4. The plunger 113 on its downward movement also engages a rocker member 117 pivoted to the sides of the machine at 118 and engageable with a lug 120 on a bell crank lever 121 which is pivoted to the frame at 122 and has one arm which engages one end of an intermediately pivoted shift lever 123 whose other end 124 is forked, see Fig. 9, and is provided with pins 125 engageable in an annular groove 126 in the disk 85' and which is normally urged out of a repeat position by a spring 127, Figs. 1, 3, 9, and 11. The disk members 85 and 85' are adapted to be shifted together along the shaft 50 as a unit, and the part 85' of this sliding assembly is slidably splined to the driven shaft 50 by a series of radially disposed pins 128 mounted on the hub of the brake cam 60 and slidable in radially disposed openings 129 in the part 85'. When, on conditions of repeat, the parts 85 and 85' are shifted toward the left as viewed in Fig. 3, the pin 88' controlling the switch arm release pawl 88 and a pin 84 controlling the cam release lever 44 are shifted out of their operative positions relative to these parts, so that the motor 51 is then under the control of the repeater mechanism. After the lever 121 is once shifted, it is retained in this shifted position by a latch 130 pivotally mounted at 131 and normally urged into locking engagement with the lever 121 by a spring 132 but released from locking engagement by the repeater mechanism as hereinafter described.

Figure 12:
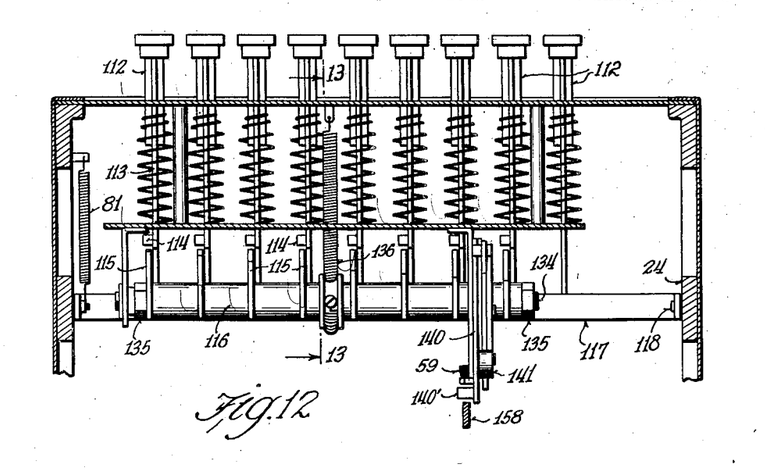
Fig. 12 is a detailed sectional view taken on the line 12—12 of Fig. 5.
Figures 14, 15:
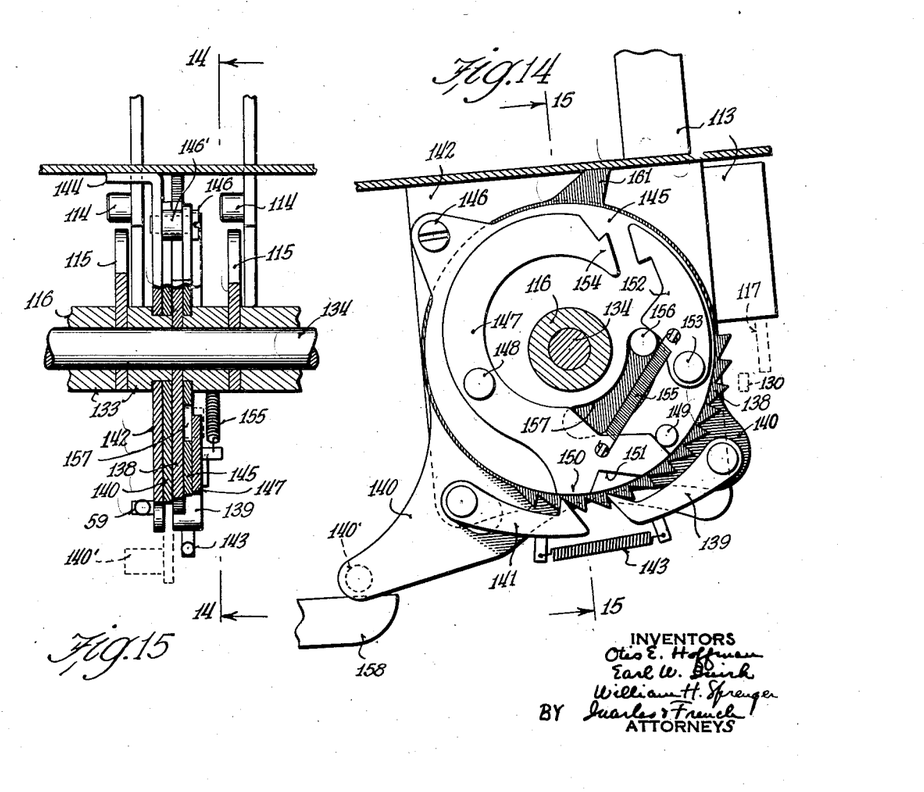
Fig. 14 is an enlarged detailed view through the ratchet control mechanism, the same being shown as a section taken on the line 14—14 of Fig. 15.
Fig. 15 is a detailed sectional view taken on the line 15—15 of Fig. 14.

The shaft 116 includes bushings 133, a clamping rod 134, and clamping nuts 135 securing said bushing with the cams 115 together as a unit, see Figs. 12 and 15. Each of the cams 115 when engaged by its key operated lug 114 is adapted to rotate the shaft 116 through a certain predetermined angle against the pressure of a tension spring 136 (see Fig. 13). The rotary movement of the setting shaft 116 is used to set the repeater mechanism which in turn controls the operation of the shifter lever 123 and through it the continued operation of the motor 51 until the desired number of cycles of the shaft 50 have been made.

The repeater mechanism shown in Figs. 4, 12, and 14 to 16 comprises a toothed segmental ratchet wheel 138 fixed to the shaft member 116, a pawl 139 pivotally mounted on an oscillatory actuating member 140, and a pawl 141 pivotally mounted on a fixed support 142 and with the pawl 139 yieldingly held in engagement with the ratchet 138 by a spring 143. The support 142 is fixed at 144 to the frame of the machine, and a plate member 145 is secured by a screw 146 and a bushing 146' in spaced relation thereto. This plate has a pawl release member 147 pivotally mounted thereon at 148 and normally engaging a stop pin 149 and having parts 150 and 151 adapted to successively engage the pawls 141 and 139 to release them at the end of a repeat cycle. The plate member 145 also has a latch 152 pivotally mounted thereon at 153 and adapted to engage the notched end 154 of said pawl release member 147, the members 147 and 152 being normally moved toward each other by a spring 155. The ratchet wheel 138 carries a pin 156 extending through an arcuate slot 157 in the plate 145 and movable into engagement with the latch 152 at the beginning of the repeat cycle and with the release member 147 at the end or last revolution of the repeat cycle. The oscillatory member 140 is moved upwardly by an oscillatory lever 158 pivotally mounted at 159 on the machine and intermittently raised through the operation of a cam projection 160 on the disk 85 (see Fig. 4) and is swung downwardly by a spring 59. The lever 158 is not operated except during a repeat cycle since it is normally out of the path of movement of the cam projection 160 and is during the operation of any one of the repeat keys brought into operative relation with said projection by the sliding movement of the disk 85 (see Figs. 3 and 9). The release of the latch 130 from the lever 121 by the repeat mechanism is effected by the movement of a lug 161 on the ratchet wheel 138 against said latch, and as soon as this occurs, the spring 127 acting on the lever 123 shifts the parts 85 and 85' and with them the cam projection 160 into a position in which said projection is out of registry with the oscillatory lever 158, and consequently further operation of the repeat mechanism is prevented, and the machine operates as a normal single revolution machine.

Figure 16:
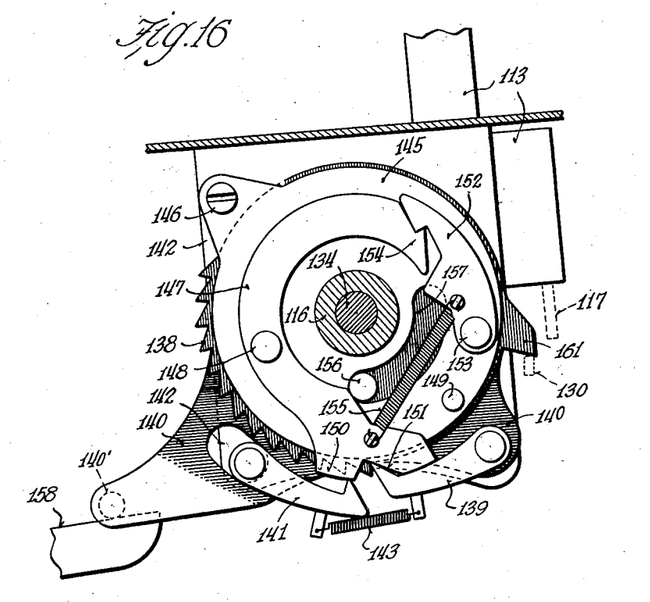
Fig. 16 is a view somewhat similar to Fig. 14 showing the parts in a different position.

With the above arrangement, each operation of the shaft 50 and the cam 160 causes one oscillation of the lever 158 and pawl carrying member 140. During each upward swing of the member 140, the pawl 139 feeds the ratchet wheel 138 through a distance of one tooth. During the downward swing of the member 140 the pawl 139 rides over the ratchet teeth while the pawl 141 holds the ratchet wheel against return movement. In this manner the pin 156 is given a step by step angular advance until it engages the pawl release member 147 and swings the part 150 outwardly into engagement with the pawl 141 releasing the same and at the same time permitting the latch 152 to swing inwardly under the action of its spring 155 to hold said member 147 in its pawl release position, and then as the member 140 swings down, the part 151 of the member 147 engages the pawl 139, and under these conditions, as shown in Fig. 16, both pawls are released and the lug 161 has moved down to a position where it engages and releases the latch 130 to shift the repeat control cam 160 to inoperative position, and the spring 136 is then free to turn the ratchet wheel 138 backwardly to its inoperative position.

The number of repetitions may be determined by the number of teeth of the ratchet wheel 138 that have to be moved through the oscillation of the member 140 before the lug 161 on the ratchet wheel strikes the release lever latch 130, and this number of teeth is pre-determined through the repeat keys by the fact that the cams 115 operated by said keys are so designed as to provide for the angular advance of from two to nine teeth depending upon the key. Each of these cams is designed to oscillate the cam shaft through the angular distance necessary to move the number of teeth representing the difference between ten and the desired repeat number, for example with the number eight key, which is the one shown in Fig. 4, the cam has moved the ratchet wheel through the distance of two teeth and then the step by step operation of the ratchet wheel through the operation of the shaft 50 and cam projection 160 as previously described will move the repeat mechanism to a release position after eight operations of the ejectors selected by the operation of the key or keys 20 and effect the disengagement of the cam projection 160 with the lever 158 and the stopping of the machine through the release of the pawl 88 and its switch operating arm 66 and the movement of the release lever 44 to a switch arm opening position.

It will also be noted that if the repeater mechanism is set and the coins in any one of the trays become depleted during the repeated operations of the machine, that the machine will automatically stop itself when this depleted condition occurs, and the depleted coin stack should then be refilled before continuing the operation of the machine on the repeating cycle.

We desire it to be understood that this invention is not to be limited to any particular form or arrangement of parts except in so far as such limitations are included in the claims.

We claim:

1. In a coin delivery machine having a coin holder, the combination, with a pivotally supported reciprocatory coin ejector member, of an ejector raising lever yieldingly acting on said ejector member to raise and yieldingly hold the same in coin ejecting position, operator controlled means for operating said raising lever, locking means to hold said lever in its raised position, and means for automatically releasing said locking means after a single reciprocation of said coin ejector member.

2. In a coin delivery machine having a coin holder, the combination with an electric motor and a coin ejector mechanism operated by said motor for ejecting coins from the holder, of repeat mechanism operated by said motor to permit said motor to operate said ejector mechanisms a plurality of times, comprising a manually settable member adapted to be set in a plurality of different positions to determine the number of operations of said coin ejector mechanisms by said motor, and operator controlled keys for determining the setting of said settable member.

3. In a coin delivery machine having a coin holder, the combination with an electric motor, a coin ejector mechanism operated by said motor for ejecting coins from the holder, and means for controlling the operation of said motor to stop the same after a single operation of said coin ejector mechanism, of repeat mechanism operated by said motor to permit said motor to operate said ejector mechanisms a plurality of times including a manually settable member, operator controlled means for determining the setting of said settable member, and operator controlled means for rendering said first named motor control means ineffective to stop said motor during the operation of said repeat mechanism.

4. In a coin delivery machine having a coin holder, the combination with an electric motor, a coin ejector mechanism operated by said motor for ejecting coins from the holder, and means for controlling the operation of said motor to stop the same after a single operation of said coin ejector mechanism, of repeat mechanism including a settable member means for holding said member in a set position and means operated by the motor for releasing said holding means, operator controlled means for determining the setting of said settable member, operator controlled means for rendering said first named motor control means ineffective to stop said motor and for rendering said release means operative on said holding means during the operation of said repeat mechanism.

5. In a coin delivery machine having coin holders for coins of different denominations, the combination of a motor, a carrier reciprocated by said motor, a coin ejector member for each holder pivotally mounted on said carrier, an ejector raising lever yieldingly engaging with each ejector member to raise and yieldingly hold the same in coin ejecting position as said carrier moves toward said holder, key controlled mechanical means for selectively operating said raising levers, means for holding the selected raised levers in raised position, and means operated by said motor for releasing said holding means after a single reciprocation of said carrier.

6. In a coin delivery machine having coin holders for coins of different denominations, the combination of a motor, a carrier reciprocated by said motor, a coin ejector member for each holder pivotally mounted on said carrier, a pair of pivoted levers yieldingly connected together, one of said levers of each pair supporting the free end of an ejector member, key controlled mechanical means connected with the others of said levers for selective operation thereof to move both levers to bring the selected ejector members to coin ejecting position, means for holding the selected sets of raised levers in raised position, and means for releasing said holding means after a single reciprocation of said carrier.

7. In a coin delivery machine having a coin holder, the combination with a motor, a current supply circuit therefor, a coin ejector mechanism operated by said motor for ejecting coins from the holder, switch means in said circuit to control the stopping and starting of the motor and means for controlling said switch means to limit the operation of said motor after a single operation of said coin ejector mechanism, of ratchet mechanism including a settable ratchet wheel, a pawl for holding said ratchet wheel in set position, means operated by said motor for releasing said pawl, operator controlled means for determining the setting of said ratchet wheel, operator controlled means for rendering said switch control means ineffective to stop said motor and for rendering said pawl release means operative after a predetermined number of operations of said coin ejector mechanism, and means operated on the release of said ratchet wheel to restore the single operation control means to operative position.

8. In a coin delivery machine having coin holders for coins of different denominations, the combination of a coin ejector for each holder movable into and out of the plane of a coin to be ejected from its associated holder, an electric motor, a current supply circuit for said motor, means operated by said motor for simultaneously operating said coin ejectors, operator controlled means for said supply circuit to start said motor and cause said motor to operate said ejector operating means through a single cycle, operator controlled keys, means selectively operable by said keys for positioning an ejector in a plane to eject a coin from its associated holder, circuit control means in said supply circuit to stop said motor, and means, operable when the coins in any one of the holders become depleted, to operate said last named circuit control means.

9. In a coin delivery machine having coin holders for coins of different denominations, the combination of a coin ejector for each holder movable into and out of the plane of a coin to be ejected from its associated holder, an electric motor, a current supply circuit for said motor, means operated by said motor for simultaneously operating said coin ejectors, operator controlled means for said supply circuit to start said motor and cause said motor to operate said ejector operating means through a single cycle, operator controlled keys, means selectively operable by said keys for positioning an ejector in a plane to eject a coin from its associated holder, circuit control means in said supply circuit to stop said motor, means, operable when the coins in any one of the holders become depleted to a predetermined number, to operate said last named circuit control means, and operator controlled means for thereafter rendering said last named means inoperative to thereby permit further operation of the machine before refilling the depleted coin holder or holders.

10. In a coin delivery mechanism having coin holders for coins of different denominations, the combination of a coin ejector for each holder movable into and out of the plane of a coin to be ejected from its associated holder, an electric motor, a current supply circuit for said motor, means operated by said motor for simultaneously operating said coin ejectors, a control switch in said circuit, operator controlled keys, means selectively operable by said keys for positioning an ejector in a plane to eject a coin from its associated holder and for closing said control switch to start said motor, means operated by said motor to open said control switch after a single operation of said ejectors including a release lever and means operable on the depression of any one of said keys to insure holding of said release lever in an open switch condition even though the keys operated may be held in depressed condition for a relatively long length of time.

11. In coin delivery mechanism having coin holders for coins of different denominations, the combination of a coin ejector for each holder movable into and out of the plane of a coin to be ejected from its associated holder, an electric motor, a current supply circuit for said motor, means operated by said motor for simultaneously operating said coin ejectors, operator controlled keys, means selectively operable by said keys for positioning an ejector in a plane to eject a coin from its associated holder, a control switch in said supply circuit for said motor, mechanism operable by the depression of any one of the keys for closing said control switch, a lever operated by said motor for releasing said switch closing mechanism after a single operation of said coin ejectors, and a dog carried by said key controlled switch closing mechanism for insuring the release of said switch closing mechanism by said lever for each single operation of said coin ejectors regardless of a continued depression of the selected key by the operator.

12. In a coin delivery machine having coin holders for coins of different denominations, the combination of a coin ejector for each holder movable into and out of the plane of a coin to be ejected from its associated holder, an electric motor, a current supply circuit for said motor, means operated by said motor for simultaneously operating said coin ejectors, a control switch for said motor, operator controlled keys, means selectively operable by said keys for positioning an ejector in a plane to eject a coin from its associated holder and for closing said control switch to start the motor, a lever for releasing said switch closing mechanism after a single operation of the coin ejectors, and mechanical means associated with said lever for releasing an ejector from its coin ejecting position after a single operation thereof.

13. In a coin delivery machine having a coin holder, the combination with a motor and its supply circuit and a coin ejector mechanism operated by said motor for ejecting coins from said holder, of repeat mechanism to cause said motor to operate said ejector mechanism a plurality of times, switch means in said supply circuit for stopping said motor to prevent operation of said coin ejector mechanism, and means for operating said switch means when the coins in said holder beome depleted during the control of said motor under said repeat mechanism.

14. In a coin delivery machine having coin holders for coins of different denominations, the combination of a coin ejector mechanism for each holder movable into and out of the plane of a coin to be ejected from its associated holder, an electric motor, a current supply circuit for said motor, means operated by said motor for operating said coin ejector mechanisms, switch means in said circuit to control the starting and stopping of said motor, means controlling said switch means to limit the operation of said motor to a single operation of said coin ejector mechanisms, operator controlled means for selectively positioning the ejectors in the planes of coins in their associated holders, a coin engaging finger for each holder yieldingly held against the coins therein, a control switch for said motor in series with said first named switch means, and means associated with all of said fingers for operating said last named control switch to stop said motor in case the coins in any one of the holders become depleted.

OTIS E. HOFFMAN.
EARL W. QUIRK.
WILLIAM H. SPRENGER.